(12) United States Patent
Rosenkranz

(10) Patent No.: US 7,534,101 B2
(45) Date of Patent: May 19, 2009

(54) PUMP WITH RADIAL PACKING RING

(75) Inventor: Kerstin Rosenkranz, Oberursel (DE)

(73) Assignee: LuK Fahreug-Hydraulik GmbH & Co. KG, Bad Homburg (DE)

( * ) Notice: Subject to any disclaimer, the term of this patent is extended or adjusted under 35 U.S.C. 154(b) by 257 days.

(21) Appl. No.: 10/562,520

(22) PCT Filed: Jun. 24, 2004

(86) PCT No.: PCT/DE2004/001324

§ 371 (c)(1),
(2), (4) Date: Apr. 17, 2006

(87) PCT Pub. No.: WO2005/001290

PCT Pub. Date: Jan. 6, 2005

(65) Prior Publication Data

US 2006/0251511 A1     Nov. 9, 2006

(30) Foreign Application Priority Data

Jun. 30, 2003   (DE) ................ 103 29 286

(51) Int. Cl.
*F01C 19/00* (2006.01)
*F03C 2/00* (2006.01)
*F04C 2/00* (2006.01)
*F04C 15/00* (2006.01)

(52) U.S. Cl. ............ 418/104; 418/75; 418/133; 418/152; 277/628; 277/910

(58) Field of Classification Search ........... 418/75, 418/77, 82, 104, 131, 133, 134, 152; 277/628, 277/910, 318, 375
See application file for complete search history.

(56) References Cited

U.S. PATENT DOCUMENTS

| 3,806,287 | A | * | 4/1974 | Sadler et al. ............. 418/225 |
| 4,050,855 | A | | 9/1977 | Sakamaki et al. ........... 418/131 |
| 5,290,155 | A | * | 3/1994 | Snow et al. ............... 418/131 |
| 6,164,928 | A | | 12/2000 | Agner .................... 417/310 |
| 6,210,103 | B1 | * | 4/2001 | Ramsay ................... 277/318 |
| 6,413,064 | B1 | * | 7/2002 | Parsch et al. ............ 418/149 |
| 6,481,990 | B2 | * | 11/2002 | Wong et al. .............. 418/133 |
| 6,817,847 | B2 | | 11/2004 | Agner ..................... 418/75 |

FOREIGN PATENT DOCUMENTS

| DE | 1 253 584 B | 11/1967 |
| DE | 100 27 990 A1 | 12/2001 |
| GB | 914 616 A | 1/1963 |
| GB | 1 051 064 A | 12/1966 |

* cited by examiner

*Primary Examiner*—Theresa Trieu
(74) *Attorney, Agent, or Firm*—Davidson, Davidson & Kappel, LLC

(57) ABSTRACT

A pump, preferably a vane cell pump for supplying a transmission with oil, includes a pump housing and a rotating group which is disposed inside the pump housing. The rotating group includes a side plate that may be mounted inside the pump housing in such a manner as to produce, at least temporarily, an axial gap between the side plate and the pump housing. A shaft is mounted inside the pump housing and a radial packing ring is located in a recess around the shaft. The packing ring seals off the rotating group towards the exterior radially on the pump housing and radially on the shaft using a sealing lip.

11 Claims, 3 Drawing Sheets

PUMP WITH RADIAL PACKING RING

BACKGROUND

The present invention relates to a pump, in particular a vane cell pump for supplying transmission oil, having a pump housing and a rotating group which is situated in the pump housing, the rotating group having a side plate which may be situated in the pump housing in such a way that, at least temporarily, an axial gap occurs between the side plate and the pump housing, a shaft is mounted in the pump housing and a radial packing ring is situated in a recess around the shaft. The axial gap establishes a bypass between a suction pressure area, which is represented by the suction pockets in the side plate and a corresponding area in the pump housing, and a leak oil pressure area which extends around the shaft in the rotor area.

BRIEF SUMMARY OF THE INVENTION

Therefore, it is an object of the present invention to create a pump which does not have these disadvantages.

The present invention provides a pump, in particular a vane cell pump for supplying transmission oil, having a pump housing and a rotating group which is situated in the pump housing, the rotating group having a side plate which may be situated in the pump housing in such a way that, at least temporarily, an axial gap occurs between the side plate and the pump housing, a shaft is mounted in the pump housing, and a radial packing ring is situated in a recess around the shaft and seals off the rotating group with respect to the exterior radially on the pump housing and radially on the shaft via a first sealing lip, the radial packing ring establishing an axial seal between the pump housing and the side plate in addition to the radial seal between the shaft (first radial sealing lip) and the pump housing. A pump is preferred in which the axial seal bridges the axial gap.

Also preferred is a pump in which the axial seal is formed by a second axially effective sealing lip. Furthermore, a pump is preferred in which the second sealing lip is situated on the radially outside bottom seal (seal with respect to the housing) of the radial packing ring.

The pump may include a radial packing ring situated in such a way that multiple radially outside sealing sections face away from the pump's interior.

Furthermore, the pump may include, via a spacer means, that the side plate is axially located with respect to the pump housing. Also preferred is a pump in which the second, axial sealing lip does not contact the shaft. This means that this sealing lip is not used for sealing the shaft, but rather for bridging the gap between the housing and the side plate.

The present invention also may provide for a pump that includes a side plate with a sealing device which elastically presses against the pump housing, thereby enlarging the axial gap (via elastic force) during the standstill of the pump, i.e., in the pressureless state of the pump. Also preferably included may be a pump in which the axial seal bridges a gap which changes due to component tolerances. Further preferably included is a pump in which the axial seal seals off a leak oil pressure area from an oil suction pressure area of the pump. This has the advantage that a bypass between the leak oil pressure area and the oil suction pressure area is prevented during start-up of the pump, thereby preventing suction delays, in particular at low temperatures.

BRIEF DESCRIPTION OF THE DRAWINGS

The present invention is described in greater detail based on the figures.

DETAILED DESCRIPTION OF THE PREFERRED EMBODIMENTS

Figure 1:
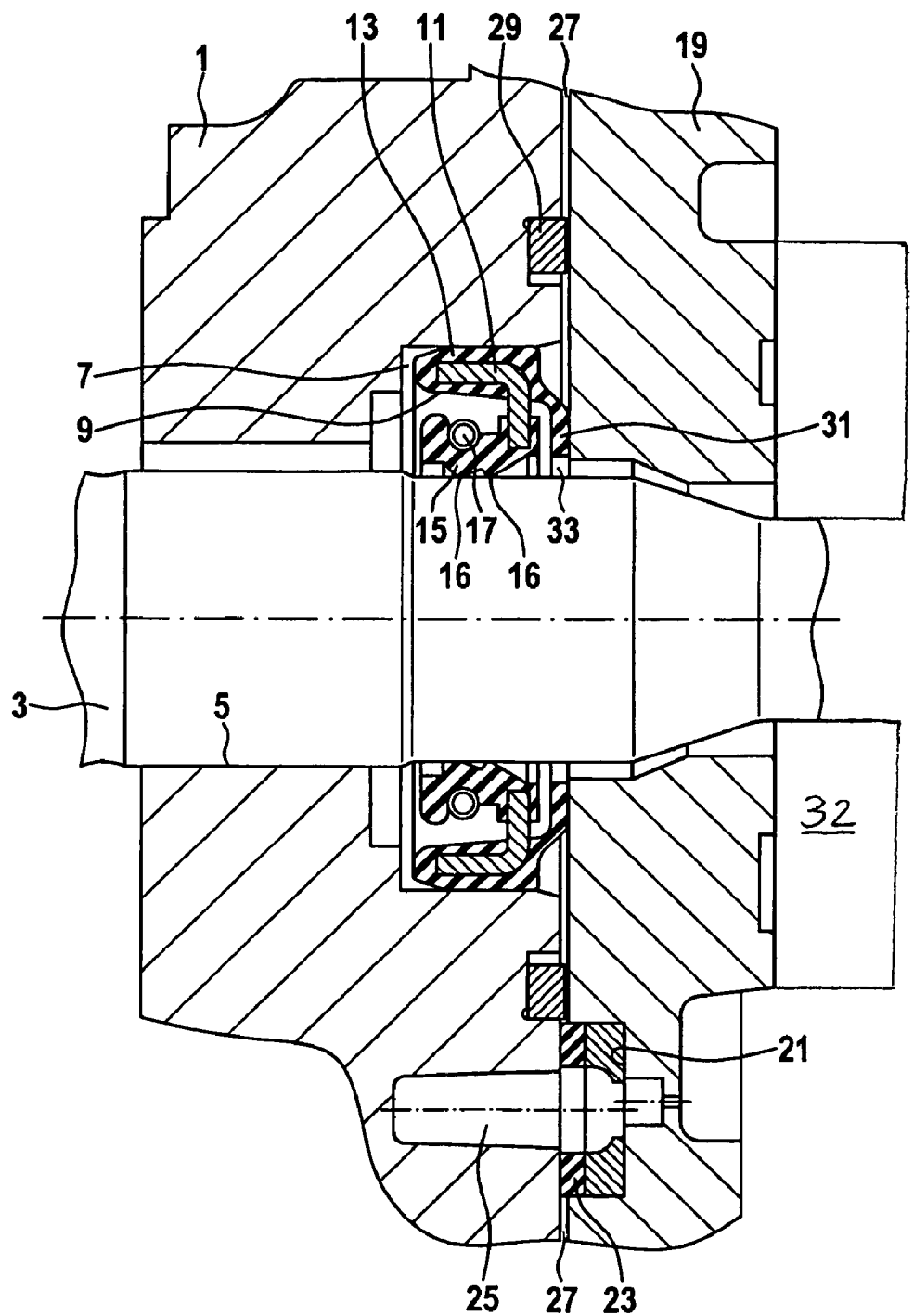
FIG. 1 shows a pump according to the present invention at a standstill.

FIG. 1 shows a cross sectional detail of a pump according to the present invention. The pump is at a standstill in this representation. A shaft 3 in a plain bearing 5 is mounted in a pump housing 1. Moreover, pump housing 1 has a recess 7 in which a radial packing ring 9 is mounted. Radial packing ring 9 has support body 11 with an L-shaped cross section which may be made of a metallic material. One leg of support body 11 is surrounded by an elastic sealing layer 13 which seals off pump housing 1. A sealing section 15 seals off the surface of shaft 3, sealing section 15 being able to have a first sealing lip or in this case multiple sealing lips (16) which slide on rotating shaft 3. The sealing lips of sealing section 15 are additionally pressed against the surface of shaft 3 due to the elastic force of a spring body 17. Sealing section 15 is situated at the other leg of support body 11 with an L-shaped cross section.

The pump also has a side plate 19 which delimits the schematically shown rotating group 32 located axially to the front. The rotating group is made up of a rotor having radial slots in which radially displaceable vanes are movably situated, a stroke contour ring, and a rear pressure plate or a rear cover formed by the housing. In a recess 21, side plate 19 contains a combination seal 23 which extends over a certain, non-circumferential area of the side plate thus radially and axially sealing the area of what is known as intermediate volume 25 (see DE 100 27 990 A1) in housing 1. During standstill of the pump, the elastic force of seal 23 generates a corresponding elastic force effect, thus pressing side plate 19 away from housing 1, thereby creating an axial gap 27. During standstill of the pump, axial gap 27 is so great that it even forms past a spacer means 29 known as a rocker ring.

The mounting position of radial packing ring 9 differs from the normal application of shaft sealing rings in that the sealing ring is mounted in such a way that it is twisted by 180° compared to normal shaft sealing rings so that its two sealing legs 13 and 15 face away from the interior of the pump. According to the present invention, radial packing ring 9 has an additional second sealing lip 31 which is molded to sealing part 13, thereby bridging and sealing axial gap 27 between pump housing 1 and side plate 19. Sealing by second sealing lip 31 is necessary because a certain leakage oil pressure prevails in area 33, the leakage oil pressure being generated by the pressure oil from the pressure chambers of the vane cell pump running past the leakage gaps between the rotor and the side plate. In contrast, the suction pressure of the pump which is lower than the leakage oil pressure in area 33 prevails in gap 27. Thus, during start-up of the pump, gap 27 is present between side plate 19 and pump housing 1, its size differing depending on the tolerance position of the components. This gap 27 would thus create a connection between the pump suction chamber (not shown), which is represented by the suction pockets in the side plate and a corresponding area in the pump housing, and leak oil pressure area 33 which extends around the shaft in the rotor area and across the shaft center toward the interior of the rotating group. A bypass would be present in this area between these pressure areas which could result in suction delays in particular at low temperatures, for example. Axial sealing lip 31 of radial packing ring 9 interrupts this connection so that a suction problem is no longer able to occur at this point. Due to the tolerance chain, there are different dimensions of the axial sealing lip for different pumps. The dimension of the axial sealing lip is selected in such a way that the sealing function is ensured in all tolerance positions and that the gap may be securely bridged and sealed.

The function of additional volume or intermediate capacity 25 is described in publication DE 100 27 990 A1, which is related to U.S. Pat. No. 6,817,847.

Figure 2:
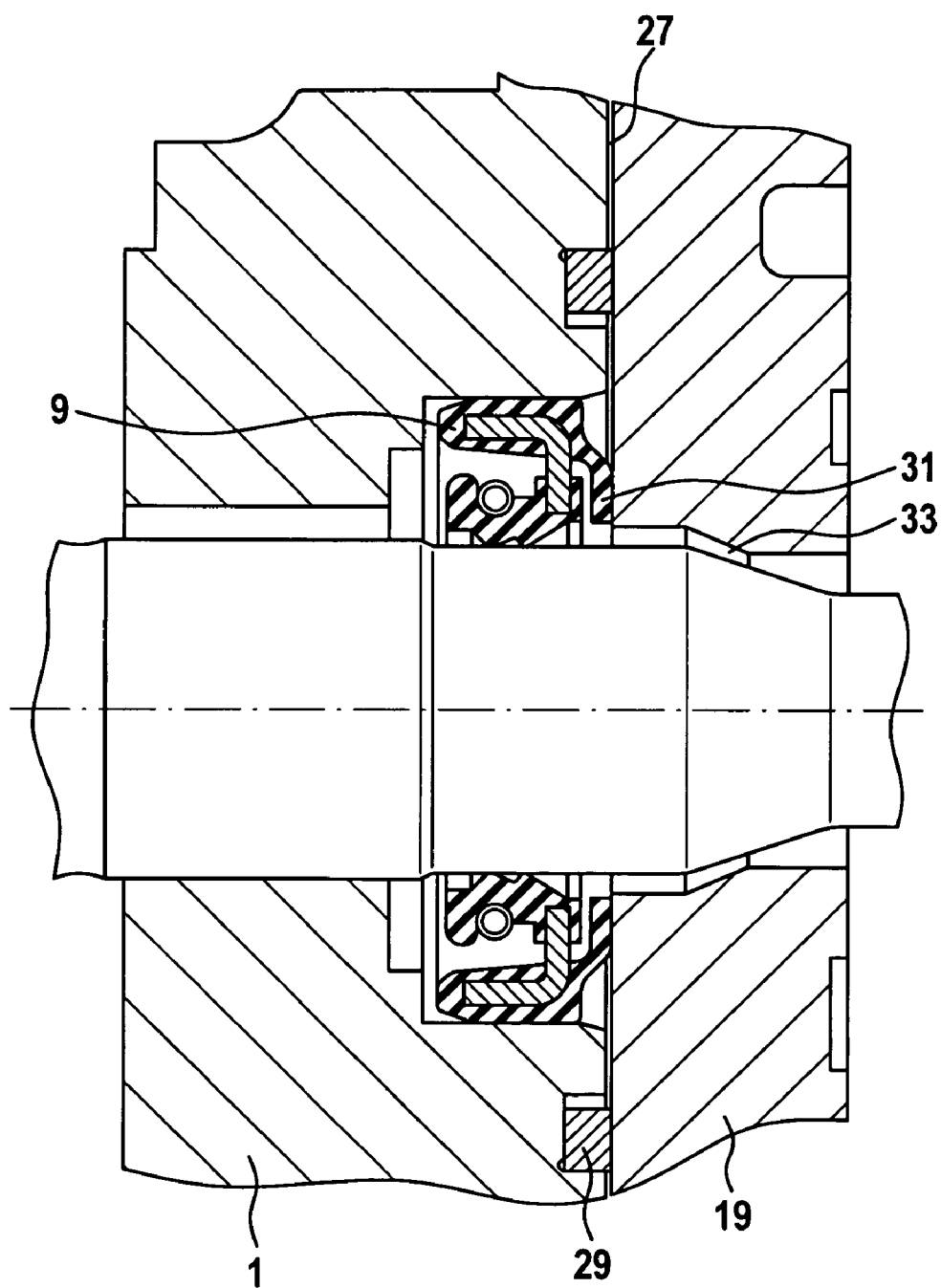
FIG. 2 shows a pump according to the present invention during operation.

FIG. 2 shows a cross section of the pump during operation. During pump operation, sealing gap 27 is reduced due to the fact that the pressure behind the rotating group presses the rotating group and thus side plate 19 against spacing means 29 in pump housing 1. Closed spacing ring 29, which extends over the circumference, thereby creates a seal between leak oil area 33 and the oil suction pressure area. Due to the pressure, combination seal 23 is correspondingly pressed together and is not able to maintain enlargement of gap 27. Depending on the pressure acting on the rotating group and side plate 19, side plate 19 may bend above rocker ring 29, thereby varying the gap width of gap 27. Elastic second sealing lip 31 of radial packing ring 9 must take part in this variation of gap 27 without being radially pressed aside or turned down by leakage pressure in area 33. Axial sealing lip 31 may not turn up outwardly due to the present differential pressure.

Figure 3:
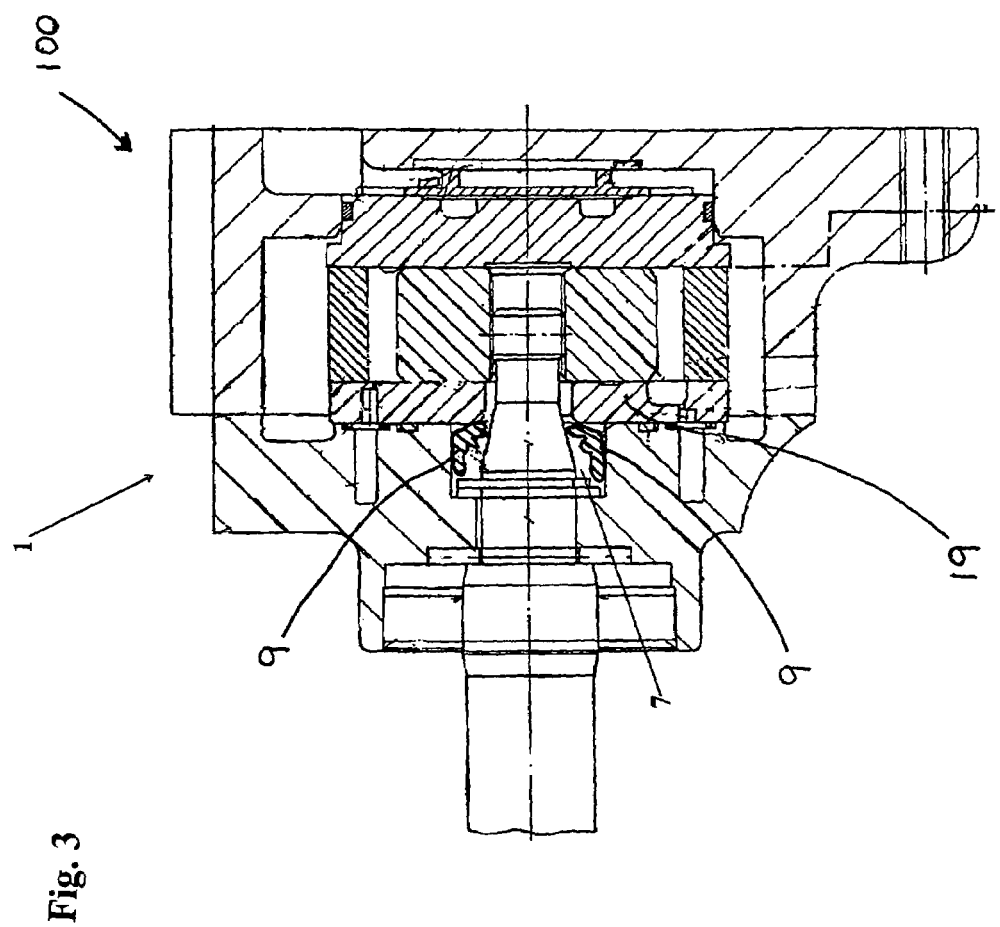
FIG. 3 shows longitudinal sectional view of a vane cell pump including a side plate and radial packing ring

FIG. 3 shows a cross section of vane pump 100. The pump includes side plate 19. Radial packing ring 9 is located in recess 7.

Another approach would be a radial packing ring and an additional O-ring which seals axially. However, the radial packing ring having an axial sealing lip is advantageous here since only a single component is installed which fulfills two functions: radial and axial sealing using separate sealing lips. Other embodiments/variants of an axial sealing lip are conceivable within the scope of the present invention.

The invention claimed is:

1. A pump for supplying transmission oil comprising:
a pump housing and a side plate for a rotating group situated in the pump housing, an axial gap occurring between the side plate and the pump housing;
a shaft mounted in the pump housing; and
a radial packing ring situated in a recess around the shaft, the radial packing ring radially sealing off the rotating group with respect to a surface on the pump housing and radially sealing off the rotating group on the shaft via a first sealing lip so as to form a radial seal between the shaft and the pump housing, the radial packing ring also establishing an axial seal between the pump housing and the side plate.

2. The pump as recited in claim 1 wherein the axial seal bridges the axial gap.

3. The pump as recited in claim 2 wherein the axial seal bridges the gap, the gap being a function of component tolerances.

4. The pump as recited in claim 2 wherein the axial seal seals a leak oil pressure area from an oil suction pressure area of the pump.

5. The pump as recited in claim 1 wherein the radial packing ring includes a second sealing lip forming the axial seal.

6. The pump as recited in claim 5 wherein the radial packing ring has a radially outside seal contacting the surface of the pump housing to radially seal off the rotating group with respect to the surface of the pump housing, the radially outside seal having the second sealing lip.

7. The pump as recited in claim 5 wherein the second sealing lip is free of contact with the shaft.

8. The pump as recited in claim 1 wherein the radial packing ring includes radially outside sealing sections facing away from the interior of the pump 9. The pump as recited in claim 1 further comprising a spacer axially positioning the side plate with respect to the pump housing.

10. The pump as recited in claim 1 wherein the side plate has a side plate seal pressing elastically against the pump housing thereby enlarging or creating the axial gap during a standstill of the pump.

11. The pump as recited in claim 1 wherein the pump is a vane cell pump.

\* \* \* \* \*